April 28, 1964  T. BRENZEN  3,131,277
SHORTING SWITCH CONTROLS
Filed April 29, 1960
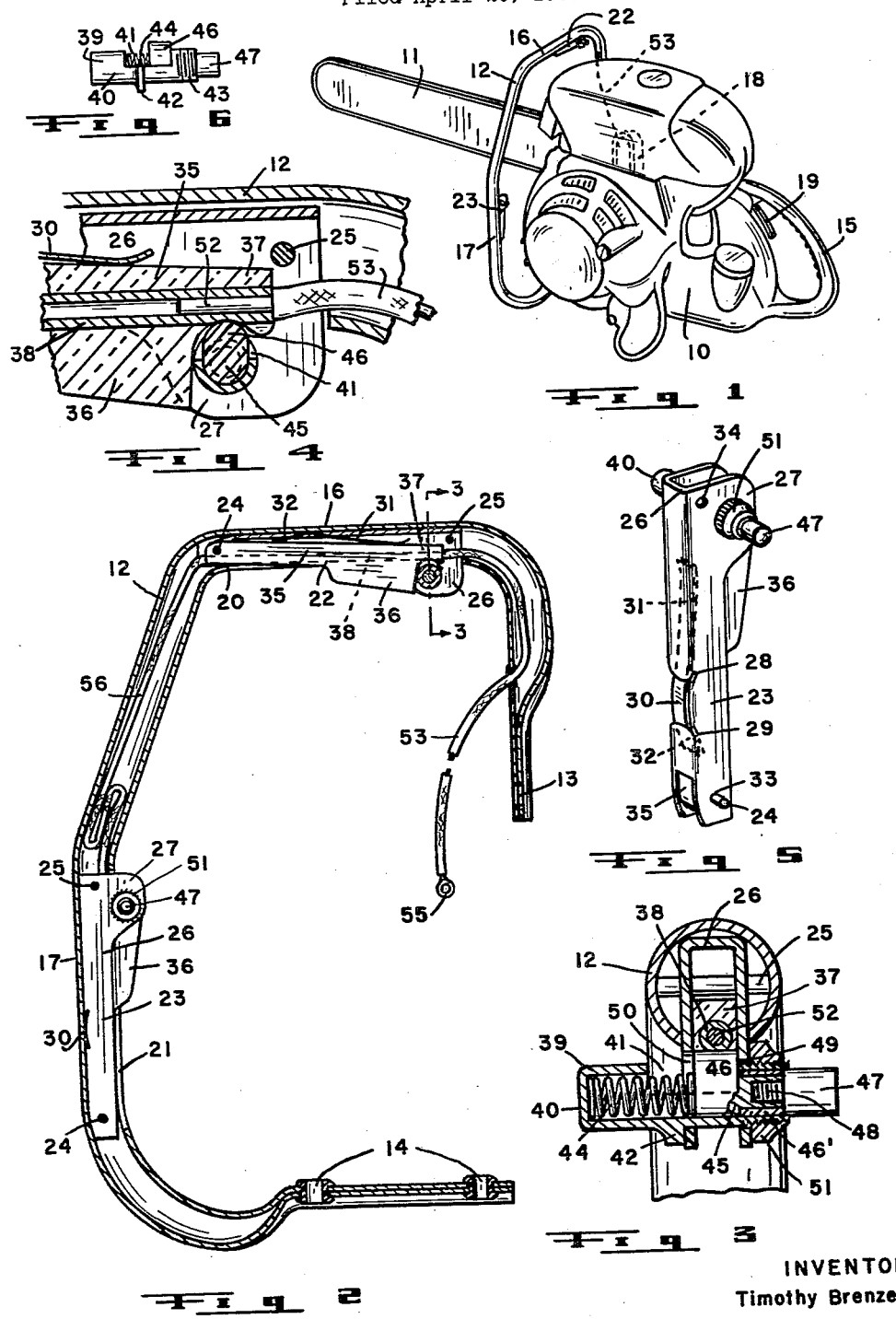
INVENTOR
Timothy Brenzen
By
*Walter C. Boggs*
Agent

United States Patent Office 3,131,277
Patented Apr. 28, 1964

3,131,277
SHORTING SWITCH CONTROLS
Timothy Brenzen, East Kildonan, Manitoba, Canada
(Red Lake, Ontario, Canada)
Filed Apr. 29, 1960, Ser. No. 25,639
4 Claims. (Cl. 200—157)

The invention relates to manually supported power tools, and more particularly to power chain saws, which are now used in the bush for cutting of trees. In such cutting, the operator holds the saw with both hands, one hand holding the upper part of a tubular supporting handle secured to the power saw, while the other hand grasps a handle at the opposite end of the saw from the blade thereof, to guide its direction. The blade of the saw can be changed from a vertical cutting position to a horizontal cutting position, or vice versa, by simply turning the power saw with the guiding hand while the opposite hand slides along and around the supporting handle to the new upper position.

The mechanism of these manually supported power saws is is usually an internal combustion motor operating the saw blade through a releasable drive. The drive is designed to disconnect the saw chain from the motor, when the latter is idling. Such motor driven saws are very powerful and the controls for same are positioned for easy finger reach by the operator.

When said saws are used in bush country, the operator carries the saw from one tree to another as the cuts both the trees and the underbrush, and of course the saw is in continuous operation. As both hands are employed in holding the saw, he must be very careful and observant to avoid tripping over stones, tangled cuttings, or other conditions which might throw him off balance. However, even with the greatest care, mistakes are made or situations arise where control of the saw is temporarily lost, and as the saw blade is exposed, serious accidents from same can and do occur, before the saw can be stopped.

The principal object of the present invention is to provide control means for said power saw whereby the saw blade will positively stop operating if either one of the operator's hands are released from the handles of the saw, and so materially reduce the number of above mentioned accidents.

A more specific object of the invention is to provide the supporting handle of the power saw with controls which are engaged by the hand grasping same, at both vertical and horizontal cutting positions, and such that if said hand should leave said supporting handle, the motor of said power saw will stop, and accordingly the saw blade.

A further object of the invention is to construct said controls in the form of electric switch mechanisms for reception in a specially constructed supporting handle, which can be produced separate from the power saw, but attachable thereto to control its operation, as will be explained.

A further object of the invention is to provide said controls without interfering with the present method of operating or manipulating the saw blade.

Still further objects of the invention are: to provide said controls in a very simple and efficient manner, without materially increasing the cost of said power saw; without interfering with its appearance or efficiency in any way; maintain all adjustments for proper operation; and such that said controls will stand up under years of rugged operation.

With the above important objects in view, the invention consists essentially in the design, construction, and arrangement of the various parts hereinafter more particularly described, reference being had to the accompanying drawings in which:

FIGURE 1 is a perspective view of a power chain saw with the controls attached thereto.

FIGURE 2 is an enlarged section through the supporting handle for said power saw, showing one control in side view and the other control in section.

FIGURE 3 is an enlarged cross section taken at 3—3, FIGURE 2.

FIGURE 4 is an enlarged section showing part of the control in the specific area around the line 3—3 of FIGURE 2.

FIGURE 5 is an enlarged perspective view of one of the controls complete.

FIGURE 6 is a side view of the thumb actuated sub-assembly for a control.

In the drawings like characters of reference indicate corresponding parts in the several figures.

An internal combustion motor is indicated at 10 in FIGURE 1 and is adapted to operate a chain saw blade, indicated at 11. The drive therebetween (not shown) only operates at a motor working speed, the chain of the saw blade being stopped when the said motor is idling. The driving end of the motor is provided with a substantially U-shaped supporting handle 12, made of tubing, which encircles one side of the motor, the upper part thereof being secured to the motor by a bolt (not shown) which passes through a hole 13 in the handle. The lower end of the supporting handle is secured to the bottom of the motor by a pair of bolts (not shown) which pass through holes 14 therein. The end of the motor, remote from the saw blade, is provided with a guiding handle 15.

By observing FIGURE 1 it will be apparent that the supporting handle 12 will carry the greater part of the saw weight, when the operator lifts same with one hand. The other hand will grasp the guide handle 15 to support part of the rear weight and at the same time direct the saw blade where required. As shown, the saw blade is in position to cut vertically, such position being used to cut fallen trees into lengths, or trim branches. When the saw blade is to be used horizontally, such as when cutting a tree down, the guide handle would be turned clockwise 90° by the hand holding the same, while the hand grasping the supporting handle at the position 16, would slide therealong to the other grasping position 17, which would then be uppermost.

On present day chain power saws, the motor is started by a pull cord (not shown) and the ignition is by magneto, indicated at 18. The throttle control 19 is under the guide handle, and the ignition switch (not shown) is positioned for convenient hand operation. To start the motor, the operator throws the ignition switch and pulls the starting cord. The throttle is controlled by the index finger of the hand holding the guide handle, while the power saw is lifted with both hands, and is ready for cutting. Should the hand on the guide handle come off, which seldom happens, the other hand will be supporting the saw, so there is not much danger. Further, as the index finger will release the throttle as the hand comes off, the motor will drop back to idling speed, and the saw blade stops operating. However, if the operator should stumble, or in any way lose his hand grasp on the supporting handle 12, such as the saw ricochetting after striking a knot, the powerful operating saw will be out of control completely, as it is only held by the rear handle. A bad accident may occur before the throttle can be released, or the motor shut off. The present invention will prevent this happening.

In the present invention, a pair of similar switch controls are directly mounted on the supporting handle 12, and as this handle is made separate from the motor, it can be produced with the controls for connection to new machines or as a new article of manufacture to be substituted for the present supporting handle on old machines. As shown in FIGURE 2, the supporting handle is inner slotted at both 20 and 21 to receive this pair or switch controls 22 and 23 respectively, same being secured to the tubing of the handle by rivets or bolts 24 and 25. A single control for this type of insertion is shown in perspective in FIGURE 5.

The above mentioned controls each present a channel-shaped frame 26, having an enlarged head 27 at one end thereof. The bottom of the channel frame is cross cut in two places 28 and 29, and the space therebetween is die pressed to provide a pocket, so to speak, for a flat spring 30 to rest thereon. The long end 31 of this spring passes through the cut 28 into the frame, while the short end 32 passes through the cut 29. A pair of holes 33 and 34 are provided through the frame, one at each end thereof, for the rivets 24 and 25 to pass through to hold same in place. An insulator member 35 is receivable in the channel frame and one end thereof is pivoted on the rivet 24. The long end 31 of the spring 30 is adapted to press against the inner edge of this member to move the opposite end thereof outward for exposure as a finger key 36 at the outer edge thereof. This key is long enough to receive two fingers of a human hand. The opposite end of the insulator member mentioned is provided with a short tongue 37 and a hole is drilled centrally and lengthwise through the member from this tongue to a position just below the pivot 24. A tubing 38, preferably of brass, is press fitted into this hole for the full length of the member, and as a terminal.

A small thumb actuated sub-assembly 39 is shown in side view in FIGURE 6. This sub-assembly consists of a deep cup-shaped casing 40, having a central portion thereof half cut-away, as at 41. The other half is provided with a flange 42, and the open end is exteriorly threaded at 43. A coil spring 44 is inserted in the casing 40, and a plunger 45, with a cam-like offset 46 at one end thereof, is passed into the casing, through the cut-away portion 41, to retain the coil spring. The opposite end of the plunger receives an insulator thereover in the form of a telescoped tubing 46', and is centrally drilled and tapped. After the plunger is received in the casing, a thumb button 47, having a reduced threaded end 48, is screwed into the tapped end hole of the plunger, as a projecting extension thereof, and to hold the insulator tubing thereon.

A hole 49 is drilled through the side of the channel frame 26, at the enlarged head 27, for the reception of the above mentioned sub-assembly 39 thereacross. This hole, on one side of the frame, is enlarged, as at 50, to conform to and receive the offset 46, as shown in FIGURE 3. The flange 42 contacts one side of the frame to limit the reception, the offset 46 is inside the frame as a stop for the spring pressed end of the member 35 (see FIGURE 4), and electrically contacts the terminal 38, to ground same. The terminal, at this point, is slightly cut-away to conform, and make a better contact, with the offset. The threaded end 43 of the casing 40, projecting from the other side of the frame 26, receives a circular knurled nut 51, to secure the sub-assembly.

By observing the construction shown in FIGURE 3, it will be seen that when the thumb button 47 is pressed, the plunger 45 with offset 46, will move through the hole 50, against the resilience of the coil spring 44, until it clears the tongue 37 of the member 35, which drops down therebehind and onto the insulator tubing 46; under the resilient pressure from the spring 30. This prevents the plunger returning, when the thumb pressure on the button is released. In the above movement of the plunger, the offset 46 disconnects from the terminal 38 and accordingly, removes the ground therefrom.

When the operator grasps the supporting handle 12 in the lifting of the power saw, the first two fingers of his grasping hand will be on the key 36 of the member 35, so this member will normally be finger pressed upward, against the resiliency of the spring 30, thus releasing the plunger 45. Accordingly, the offset 46 will return to its position under the tongue 37 and the cut-away portion of the terminal 38, by the resiliency of the spring 44. Should the said two fingers be withdrawn, as by the hand leaving the supporting handle, the spring 30 will return the member 35 down, to re-contact the terminal 38 with the offset 46, and ground same.

It will be seen in FIGURE 4 that the bared end 52 of a cable 53 can be manually and frictionally pressed into the end of the terminal 38, above the offset stop 46, for electrical contact with said terminal. In FIGURE 2, it will be seen that the opposite end of this cable 53 passes out of the tubular supporting handle through a hole 54 therein, and is then provided with an eyelet 55 for connection to the ignition system of the power saw motor, as will be later explained. As the two switch control mechanisms 22 and 23 are the same, a cable 56 can be connected between the two terminals thereof, one bared end (not shown) being connected to the control 23 in the same manner as shown at 52, while the other bared end (not shown) is inserted at the opposite end of the terminal in the control 22.

The ends of the supporting handle shown in FIGURE 2 will be secured to the motor 10 by the fastening bolts mentioned for the holes 13 and 14. When the attachment is secure, the eyelet 55 will be connected to the magneto 18 in the well known manner (not shown) to short the ignition system of the motor, if one or both of the terminals of the switch controls are grounded. Obviously, by thumb pressing the buttons 47 of both controls, both grounds can be removed, and the motor started, as explained. The operator then lifts the power saw with both hands, while the motor is running, and he can vary the speed thereof with the hand holding the guide handle, as the index finger thereof will be on the throttle control 19. The other hand, holding the supporting handle, say at the position 16, will have released the plunger 45, as the first two fingers thereof will have lifted the member 35. While these fingers are pressing the key 36 and holding the member 35 up, no short is on the ignition of the motor. However, should the hand holding the supporting handle be thrown therefrom, the member 35 will be released and instantly drop down on the stop offset 46 to ground the terminal, and the ignition system will be shorted to stop the motor.

Should the operator wish to change the saw blade from one cutting position to the other, while the motor is running, he can thumb press the button 47, and while so pressed, release his first two fingers from the key 36. The other fingers will support the handle. The tongue of the member 35 will accordingly drop behind the offset 46. He can then turn the power saw by the guide handle, and slide the hand holding the supporting handle therealong to the new upper gripping position, without the motor stopping. As soon as his fingers press upwardly on the key of the new member 35, the plunger thereadjacent will be released, and he is again protected if his hand should be thrown from the supporting handle.

From the above disclosure it will be appreciated that, while the saw blade will stop operating when the operator's hand leaves the guide handle, due to the motor idling, and so protect him from possible injury, I have now protected him from the more dangerous possibility of his hand leaving the supporting handle, irrespective of whether he is using the saw vertically or horizontally.

In FIGURE 3 it will be seen that the portion of the casing 40, containing the spring 44, projects a distance outside the supporting handle 12, and may interfere with the sliding movement of the supporting hand from one cutting position to the other. Accordingly, it is contemplated to sink the inner end of the spring 44 into the offset end of the plunger 45, so said casing end can be shortened.

What I claim as my invention is:

1. A shorting switch comprising a metallic frame, a movable switch member mounted on but electrically insulated from said frame, a control button mounted on said frame adjacent said switch member, said button having a contact portion grounded to the frame and an insulator portion, a spring normally pressing said switch member against said grounded contact portion of said button for an electrical short of the switch member to said frame and for partial projection of the switch member from the frame to serve as a finger key, resilient means normally holding said button in a position wherein said grounded contact portion thereof may be contacted by said switch member, said button being manually operable against the action of said resilient means to a second position wherein said spring presses said switch member against said insulator portion of the button for disconnecting the short between the switch member and said frame, said button in its second position being in a locked engagement with said switch member to prevent movement of the button by said resilient means to its initial position until said finger key of the switch member is manually operated against the action of said spring, and means for making an electrical connection to said switch member.

2. The device as defined in claim 1 wherein said switch member comprises a body of insulating material and a metallic terminal carried by said body, said terminal being engageable selectively with said grounded contact portion and with said insulator portion of said button, said means for making an electrical connection being connected to said terminal.

3. The device as defined in claim 2 wherein said grounded contact portion of said button is provided with an offset projecting to one side of said insulator portion, the insulating body of said switch member being engaged by the offset of said grounded contact portion to lock said button against movement to its initial position by said resilient means.

4. A safety hand support for attachment to a motor operated tool having an ignition system, said support comprising a metallic handle, means for releasably securing said handle to the tool in an electrical connection, a shorting switch provided in said handle and comprising a movable switch member including a body of insulating material and a metallic terminal carried by said body, a control button mounted in said handle adjacent said switch member, said button having a contact portion grounded to said frame and an insulator portion, a spring normally pressing said switch member so that said terminal thereof engages said grounded contact portion of said button for an electrical short of the terminal to said handle and for partial projection of the switch member from the handle to serve as a finger key, resilient means normally holding said button in a position wherein said grounded contact portion thereof may be contacted by said terminal, said button being manually operable against the action of said resilient means to a second position wherein said spring presses the terminal of said switch member against said insulator portion of the button for disconnecting the short between the terminal and said handle, said button in its second position being in a locked engagement with the body of the switch member to prevent movement of the button by said resilient means to its initial position until said finger key of the switch member is manually operated against the action of said spring, and means for electrically connecting said terminal to the ignition system of the tool.

References Cited in the file of this patent

UNITED STATES PATENTS

| | | |
|---|---|---|
| 1,691,188 | Hall | Nov. 13, 1928 |
| 1,804,442 | Smith | May 12, 1931 |
| 2,263,136 | Knouse et al. | Nov. 18, 1941 |
| 2,552,471 | Watkins | May 8, 1951 |
| 2,610,657 | Kiekhaefer | Sept. 16, 1952 |
| 2,928,921 | Cranmore | Mar. 15, 1960 |